United States Patent
Xu et al.

(10) Patent No.: US 10,367,578 B2
(45) Date of Patent: Jul. 30, 2019

(54) APPARATUS AND METHOD FOR A BANDWIDTH ALLOCATION APPROACH IN A SHARED BANDWIDTH COMMUNICATIONS SYSTEM

(71) Applicant: Hughes Network Systems, LLC, Germantown, MD (US)

(72) Inventors: Jun Xu, Clarksburg, MD (US); Robert Torres, New Market, MD (US); John Border, Adamstown, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/686,768

(22) Filed: Apr. 14, 2015

(65) Prior Publication Data

US 2015/0296409 A1  Oct. 15, 2015

Related U.S. Application Data

(60) Provisional application No. 61/979,508, filed on Apr. 14, 2014.

(51) Int. Cl.
*H04B 7/185* (2006.01)
*H04W 28/02* (2009.01)
(Continued)

(52) U.S. Cl.
CPC ..... *H04B 7/18584* (2013.01); *H04L 41/0896* (2013.01); *H04L 43/0888* (2013.01);
(Continued)

(58) Field of Classification Search
CPC .................................................. H04B 7/18584
See application file for complete search history.

(56) References Cited

U.S. PATENT DOCUMENTS

| 7,995,549 | B2 * | 8/2011 | Karlsson | H04W 28/22 |
| | | | | 370/342 |
| 8,094,681 | B2 * | 1/2012 | Elliot | H04L 47/10 |
| | | | | 370/468 |

(Continued)

OTHER PUBLICATIONS

PCT/US2015/025837 ISW & WO, Jul. 23, 2015.
EPO, "Extended European Search Report & Written Opinion", EP15779261.5, dated Nov. 6, 2017.

*Primary Examiner* — Jason E Mattis
(74) *Attorney, Agent, or Firm* — Potomac Technology Law, LLC (57) ABSTRACT

An approach is provided for delivering high throughput inroute bandwidth to a terminal in a shared bandwidth satellite communications system. A backlog level of each of a number of remote terminals is monitored, wherein the backlog level of each terminal reflects an amount of data traffic awaiting transmission via an inroute channel of the communications system. When it is determined that the backlog level of one terminal meets a first threshold level, the terminal is assigned to an express priority bandwidth allocation stage. The backlog level of the terminal is monitored while assigned to the express priority stage. When it is determined that the backlog level of the terminal has fallen below a second threshold level, the terminal is removed from the express priority stage. Further, a probability is applied to a qualifying terminal, where the probability controls whether the terminal is assigned to the express priority bandwidth stage.

14 Claims, 6 Drawing Sheets

(51) Int. Cl.
*H04W 72/12* (2009.01)
*H04L 12/865* (2013.01)
*H04L 12/26* (2006.01)
*H04L 12/24* (2006.01)

(52) U.S. Cl.
CPC .......... *H04L 43/16* (2013.01); *H04L 47/6275* (2013.01); *H04W 28/0284* (2013.01); *H04W 72/1221* (2013.01); *H04W 72/1247* (2013.01)

(56) References Cited

U.S. PATENT DOCUMENTS

| | | |
|---|---|---|
| 2002/0004369 A1 | 1/2002 | Kelly et al. |
| 2002/0073167 A1* | 6/2002 | Powell ................ H04L 12/5692 709/217 |
| 2003/0189934 A1 | 10/2003 | Jeffries et al. |
| 2004/0203743 A1 | 10/2004 | Macridis et al. |
| 2005/0041673 A1 | 2/2005 | Jiang et al. |
| 2006/0018277 A1* | 1/2006 | Petrovic ................ H04L 47/626 370/329 |
| 2006/0148483 A1 | 7/2006 | Howard et al. |
| 2009/0316633 A1* | 12/2009 | Kato .................... H04L 1/0026 370/329 |
| 2010/0008228 A1* | 1/2010 | Chakravorty ........... H04L 47/10 370/236 |
| 2010/0157915 A1* | 6/2010 | Tsai ....................... H04L 47/10 370/329 |
| 2010/0158039 A1* | 6/2010 | Koide .................... H04B 3/542 370/447 |
| 2012/0120796 A1 | 5/2012 | Chu et al. |
| 2013/0136004 A1 | 5/2013 | Torres et al. |

\* cited by examiner

APPARATUS AND METHOD FOR A BANDWIDTH ALLOCATION APPROACH IN A SHARED BANDWIDTH COMMUNICATIONS SYSTEM

RELATED APPLICATIONS

This application claims the benefit of the earlier filing date under 35 U.S.C. § 119(e) of U.S. Provisional Application Ser. No. 61/979,508 (filed 2014 Apr. 14).

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems. For example, in a network with multiple remote nodes (e.g., remote terminals) using shared bandwidth to attempt to send data into the network, quality of service (QoS) is required on every link of the network in each direction. Further, an appropriate bandwidth allocation mechanism is required to achieve the QoS requirements for interactive traffic, while maintaining a balance to satisfy high throughput needs of remote terminals. In the satellite network, for example, supporting remote terminal data traffic requirements over the return or inroute link (the link from the remote terminal back to the gateway) presents significant challenges with regard to network resource management. Such challenges are due to various factors, including difficulty in balancing real-time data traffic requirements of each remote terminal versus aggregate bandwidth availability for all remote terminals.

Moreover, certain conditions may be present in such a system, such as: (1) the existence of interactive applications that are more latency sensitive such as VoIP and web-browsing, which require bursts of small bandwidth allocations when the application is actively transmitting data, (2) treatment of bulk traffic as lower priority, (3) receipt by remote terminals of bandwidth in anticipation of application requirements or for satisfaction of small bursty interaction needs, and (4) the fact that certain high throughput transfers are not long lived, and are thus benefited by a quick transfer time if network resources are available. In the presence of such conditions, it becomes a challenge to satisfy certain remote terminal bandwidth requirements. For example, such criteria may include utilization of request-based bandwidth allocation mechanisms to allocate bandwidth and meet the delay requirement for Interactive traffic, providing continuous dedicated bandwidth at some predefined rate that meets the delay requirement (which presents inefficiencies in terms of channel/bandwidth utilization), and addressing changes in application bandwidth requirements and continuing to allocate bandwidth in a manner that minimizes transmission delays and increases channel/bandwidth utilization.

Current bandwidth on demand (BOD) systems or algorithms (e.g., temporary priority inversion), however, fail to satisfy such criteria. In a shared bandwidth access network (e.g., a satellite network), while fairness can be proportionally achieved, a remote terminal may lose the chance to reach its subscribed rate plan, even for a short but sustained period of time. For example, on the shared return channel (the inroute from the remote terminal to the traffic gateway) of the satellite network, a backlog based Proportional Fair algorithm may be applied in bandwidth allocation among plural remote terminals. While fairness can be proportionally achieved, however, a terminal may lose the chance to reach its subscribed rate plan (e.g., even for a short but sustained period of time). Further, transmission of large data files cannot be accomplished at efficient speeds.

What is needed, therefore, is a system and method to address the challenges providing an appropriate bandwidth allocation mechanism in a shared bandwidth network environment, which assures subscribed throughput rates of a remote terminal for a sustained amount of time, facilitates satisfactory speed performance for remote terminals, and achieves efficient speeds for transmission of large data files, without affecting system performance.

SOME EXAMPLE EMBODIMENTS

The present invention advantageously addresses the foregoing requirements and needs, as well as others, by providing a bandwidth allocation approach (e.g., for a shared bandwidth network environment, such as a shared bandwidth satellite system) that assures subscribed throughput rates of a remote terminal for a sustained amount of time, facilitates satisfactory speed performance for remote terminals, and achieves efficient speeds for transmission of large data files, without affecting system performance.

In accordance with example embodiments a method is provided for delivering temporary preferred high throughput inroute bandwidth for a remote terminal in a shared bandwidth communications system. A backlog level of each of a number of remote terminals is monitored, wherein the backlog level of each terminal reflects an amount of data traffic within the terminal awaiting transmission via an uplink inroute channel of a wireless communications system. A determination is made that the backlog level of a one of the remote terminals meets a first threshold level that qualifies the one terminal for access to an express priority bandwidth allocation stage, and the one terminal is assigned to the express priority bandwidth allocation stage based on the backlog level meeting the first threshold. The backlog level of the one terminal is monitored while assigned to the express priority bandwidth allocation stage. A determination is made that the backlog level of the one terminal has fallen below a second threshold level that disqualifies the terminal from remaining in the express priority bandwidth allocation stage, and the one terminal is accordingly removed from the express priority bandwidth allocation stage. According to further embodiments, when it is determined that the backlog level of the one remote terminal meets the first threshold level, a probability is applied to the one terminal, wherein the applied probability controls whether the terminal is assigned to the express priority bandwidth allocation stage, or whether the terminal is assigned to a backlog based bandwidth allocation stage of a lower priority level than that of the express priority bandwidth allocation stage.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A bandwidth allocation approach (e.g., for a shared bandwidth network environment, such as a shared bandwidth satellite system) that assures subscribed throughput rates of a remote terminal for a sustained amount of time, facilitates satisfactory speed performance for remote terminals, and achieves efficient speeds for transmission of large data files, without affecting system performance, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
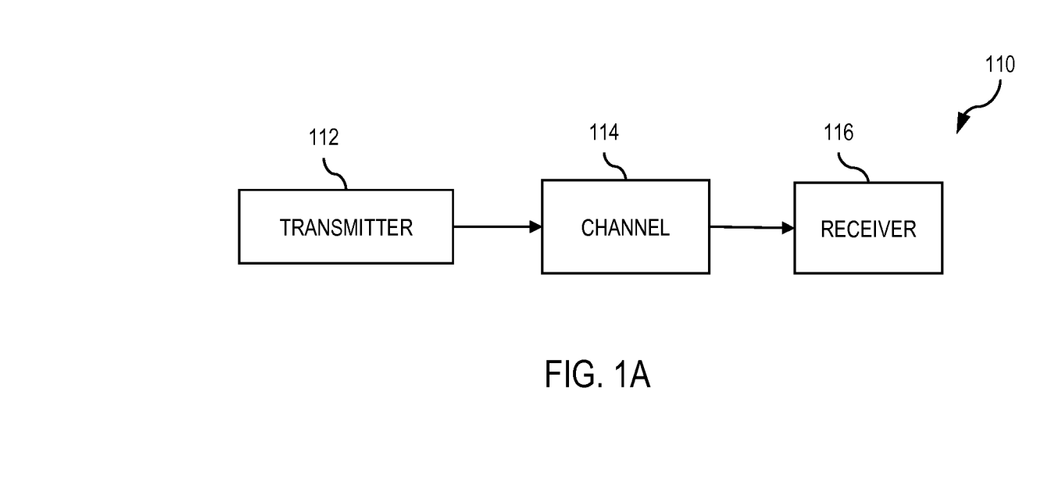
FIGS. 1A, 1B and 1C illustrate communications systems capable of employing approaches, in accordance with example embodiments of the present invention.
Figure 1B:
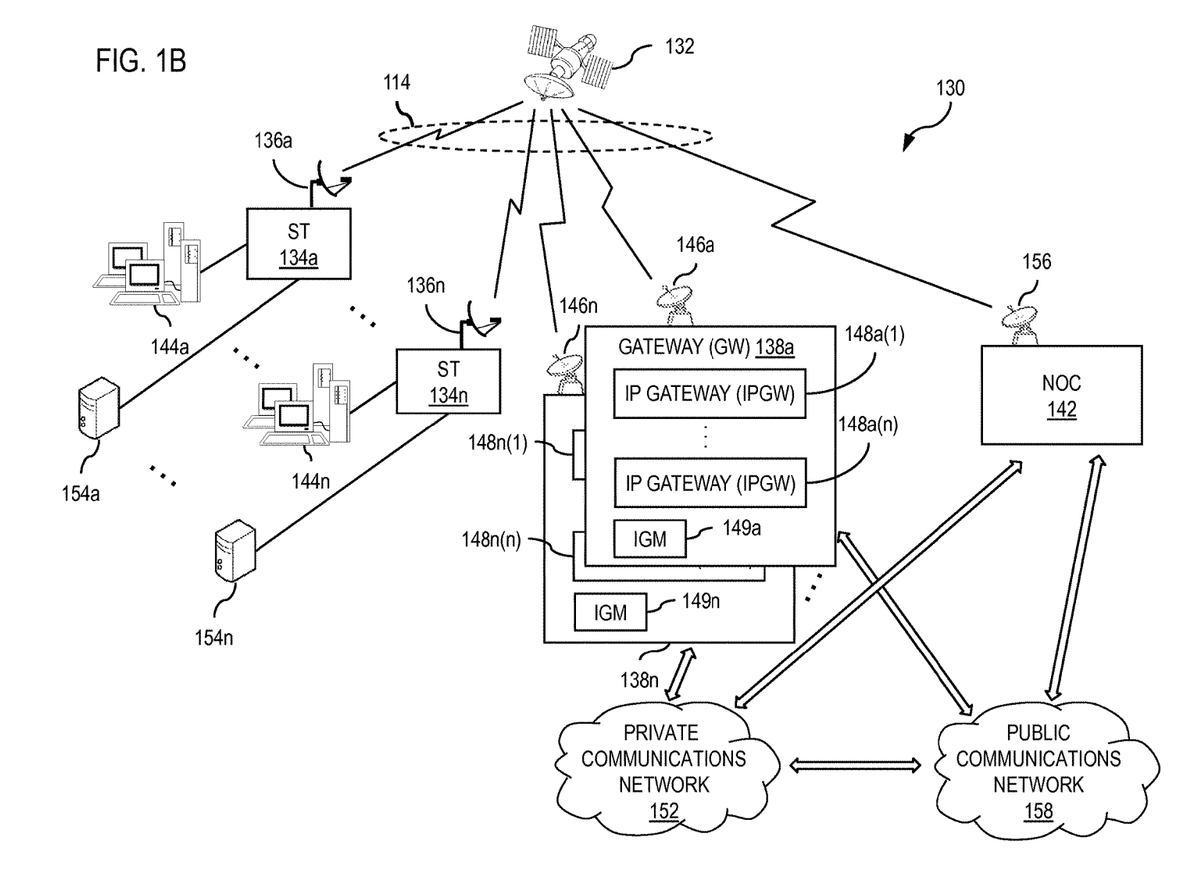
Figure 1C:
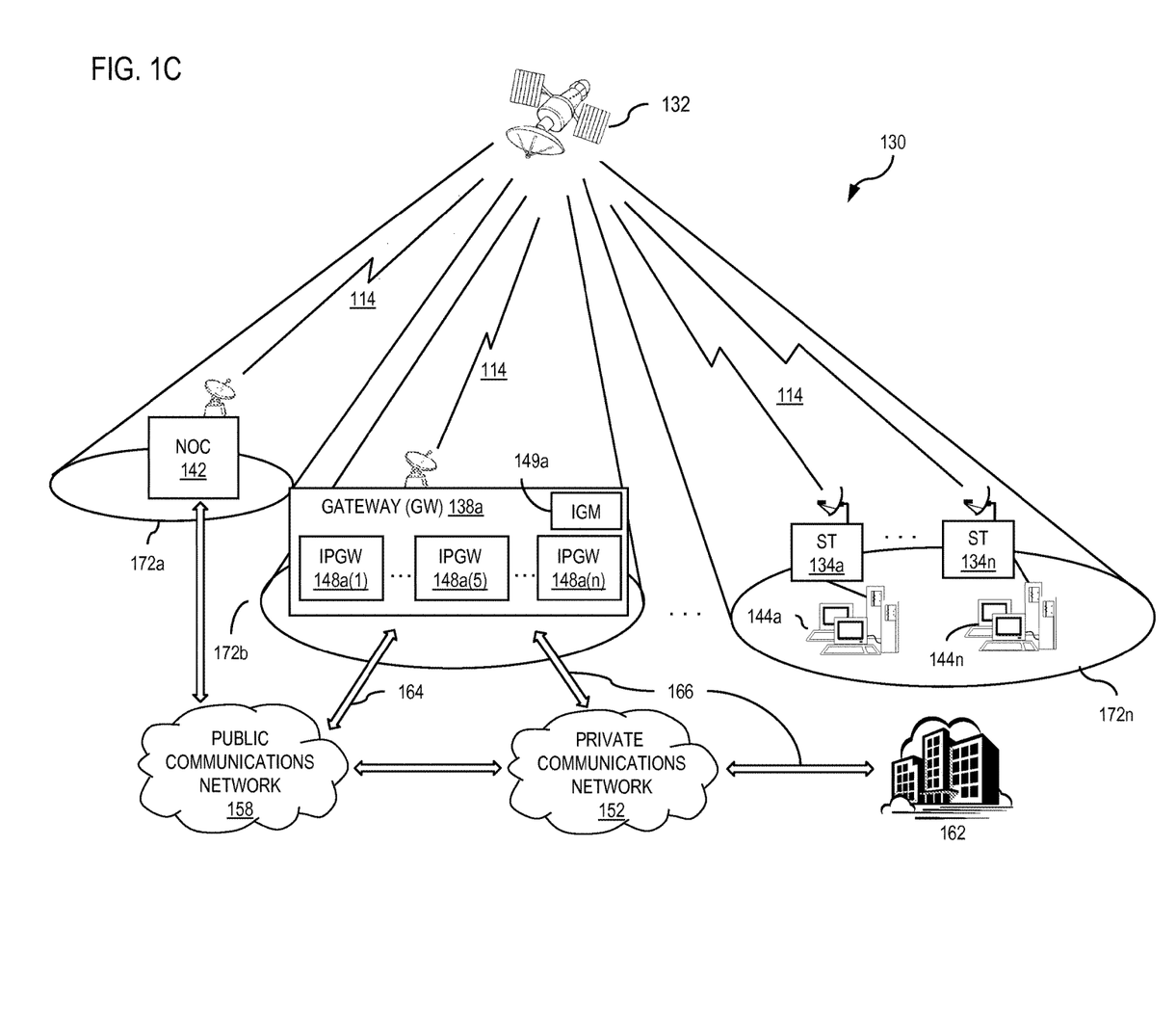

FIGS. 1A-1C illustrate communications systems capable of employing a bandwidth allocation approach (e.g., for a shared bandwidth network environment, such as a shared bandwidth satellite system) that satisfies QoS requirements for interactive traffic, while optimizing channel/bandwidth utilization, according to various example embodiments. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114.

FIG. 1B illustrates an example satellite communications system 130 capable of supporting communications among terminals with varied capabilities, according to example embodiments. Satellite communications system 130 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

Generally, in such a system, the traffic channels are referred to in a manner with respect to a GW. For example a traffic channel for data transmissions via the satellite to the GW (e.g., an uplink channel for data transmissions from a user terminal beam to the satellite in combination with a downlink channel for data transmissions from the satellite to a the GW beam) is referred to as an inroute. Further, with regard to an uplink inroute channel from a one user terminal beam, uplink inroute channel may be shared by multiple remote terminals within that user terminal beam. Similarly, with regard to a downlink inroute channel to a particular GW beam, data traffic from multiple different user terminal beams that is destined for that particular GW beam may be transmitted by the satellite via a single transponder and thereby share the downlink inroute channel to the particular GW beam. Additionally, multiple similar uplink inroute channels from a single user terminal beam may be grouped as a single inroute group managed by an inroute group manager (IGM) 149a-149n at the respective GW. For example, all 2 Msps uplink inroutes of a particular user terminal beam may be grouped as a single inroute group, and the respective IGM would manage the inroute group of 2 Msps inroutes as a single uplink bandwidth resource pool.

In a bent-pipe system of an example embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1)-148a(5)—where the pool of IPGWs is a suitable subset of the IPGWs 148a(1)-148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(5)). The IPGW 148a(5) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134a-134n)—where STs 134a-134n are correspondingly associated with the two IPGWs 148a(1) and 148a(5) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a(5). The IPGWs determine that the communication is destined for the remote STs 134a-134n, and package the data as a multicast communication addressed to the community of STs 134a-134n. The IPGWs then transmit the data communication, via the satellite 132, for decoding by the community of STs 134a-134n. Accordingly, the satellite of such a system acts as a bent pipe or repeater, transmitting communications between the STs 134a-134n and their respective associated IPGWs 148a-148n.

For traffic management in such a system, a critical element for service differentiation is the identification and mapping of ingress traffic to a traffic class best suited to support respective quality of service (QoS) requirements. Mechanisms for service differentiation in packet data networks (e.g., the Internet) generally rely on packet classification. Further, for improved efficiency, such traffic classification should be employed in a practical and expeditious manner, at the early stages of a traffic flow, such as at a terminal node where the traffic flow originates. Additionally, traffic classification methods may also be employed to identify flows that are to be mapped to special process functions, such as TCP performance enhancing proxies, packet drop, header compression, etc.

Figure 2:
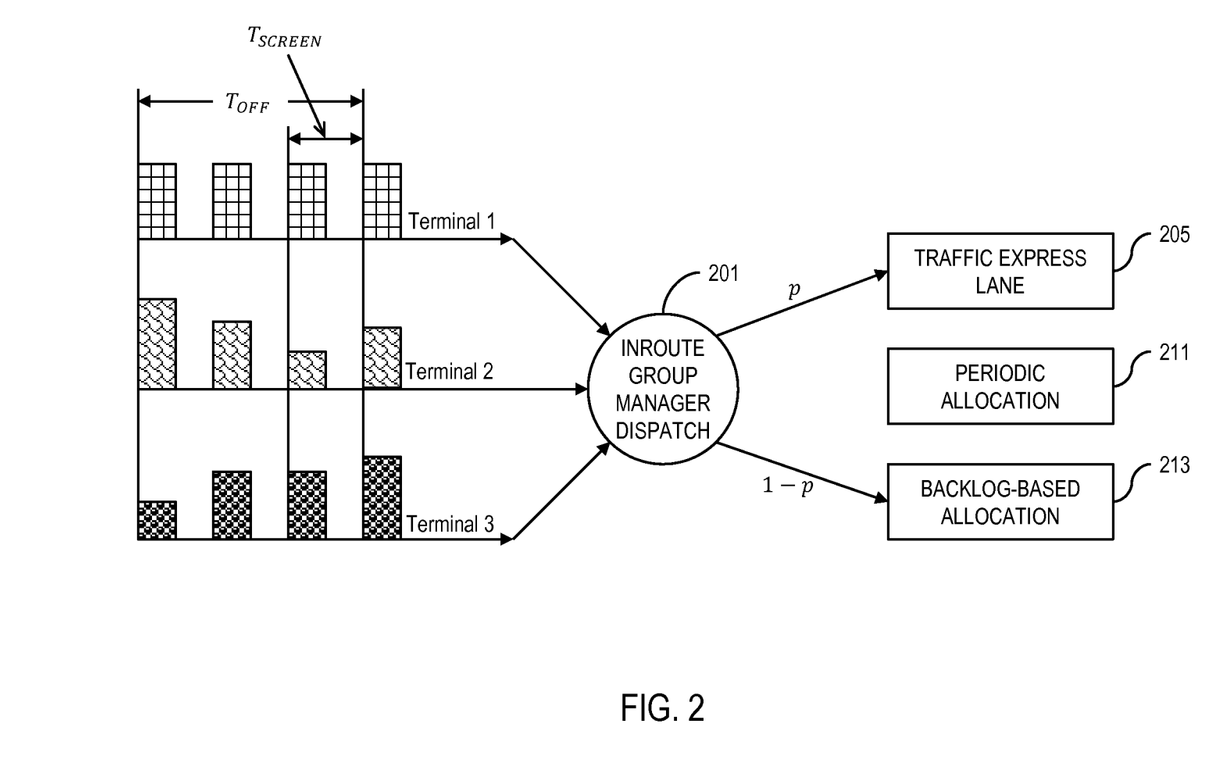
FIG. 2 illustrates a block diagram depicting bandwidth allocation, including the provision of temporary preferred high throughput bandwidth for a remote terminal, positioned before a periodic bandwidth allocation and backlog based allocation, in accordance with example embodiments of the present invention.
Figure 3:
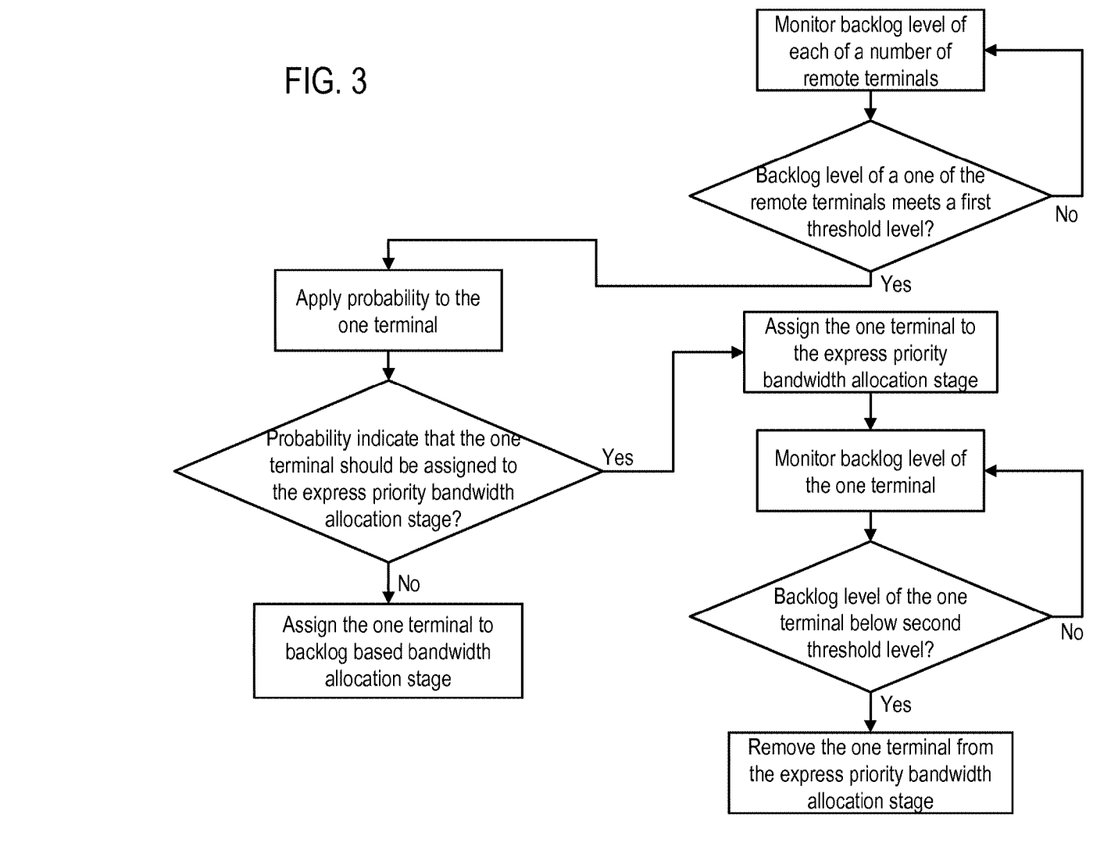
FIG. 3 illustrates a flow chart depicting a process for a bandwidth allocation approach, including the provision of temporary preferred high throughput bandwidth for a remote terminal, positioned before a periodic bandwidth allocation and backlog based allocation, in accordance with example embodiments of the present invention.

FIG. 2 illustrates a block diagram depicting bandwidth allocation, including the provision of temporary preferred high throughput bandwidth for a remote terminal, positioned before a periodic bandwidth allocation and backlog based allocation, in accordance with example embodiments of the present invention. In accordance with such example embodiments, with reference to FIG. 2, a high throughput stage of bandwidth allocation ("Traffic Express Lane") 205 is provided within the overall sequence or process of inroute bandwidth allocation. As shown in the figure, this high throughput stage of bandwidth allocation is positioned before a stage for periodic bandwidth allocation 211 and a stage for backlog based allocation 213. With such a bandwidth allocation mechanism, for example, the available bandwidth of a shared inroute or shared inroute group may be allocated in a priority fashion, first to meet the requirements of the terminals currently being allocated bandwidth via the Traffic Express Lane, second to satisfy the needs of the terminals currently being allocated bandwidth on a periodic basis, and third to satisfy the needs of the terminals currently being allocated bandwidth on a backlog basis. In accordance with further example embodiments, however, the slot allocation for data traffic of voice over IP (VOIP) or other real-time services would be allocated bandwidth at the highest priority, even above the priority of the Traffic Express Lane data traffic.

By way of example, take a 2 Msps inroute dedicated on a single inroute basis to the Traffic Express Lane. In this example, one user terminal, with a 2 Mbps service plan, may be granted access or allocated bandwidth from the express lane for any given period of time. Alternatively, for a higher symbol rate inroute dedicated on a single inroute basis to the Traffic Express Lane, multiple 2 Mbps terminals may be granted access to the express lane at any given point in time. Further, in the case of an inroute group, for example, of multiple 2 Msps inroutes, one or more of the inroutes can be allocated for express lane traffic, depending on requirements, for any given period of time. By way of further example, based on certain criteria, the Inroute Group Manager (IGM) 201 determines one or more user terminals that will be granted access to the Traffic Express Lane for particular time intervals during which the express lane is active. By way of further example, upon termination of the access period for the respective terminals currently accessing the bandwidth of a particular express lane, the express lane may be shut down or rendered idle for a period of time prior to being allocated to one or more other user terminals.

According to such example embodiments of the Traffic Express Lane, with further reference to FIG. 2, an approach for the provision of temporary preferred high throughput bandwidth for remote terminals may be implemented as follows. As will be apparent, the following described approach would be applicable to either a single inroute assigned as an express lane or an inroute group with one or more inroutes assigned as express lane(s). Particular instances where either a single inroute or an inroute group is being addressed will explicitly indicate as such. Further, within an inroute group, one or more inroutes may be dedicated to the express lane at any given time based on various conditions and parameters, such as current probabilities and statistics as applied to the qualifying terminals at that given point in time (as further discussed below).

In accordance with example embodiments, an IGM periodically screens a group of remote user terminals relative to certain predetermined criteria that form the basis for granting a remote terminal access to the express lane. By way of example, such screening criteria may comprise one or more of the modulation and coding scheme of each terminal and a reported backlog of the respective terminal. A further criteria may be to only select 2 Mbps terminals for access to a 2 Msps inroute express lane. Further, the periodic screening is performed based on a predetermined time period, which will hereinafter be referred to as the Screening Period, and will be denoted as $T_{SCREEN}$. By way of further example, the screening period may be a preconfigured time period, or may be dynamically adjustable depending on circumstances such as time of day, inroute congestion, etc. According to certain embodiments, the screening period is configurable, and is typically set as a multiple of the backlog reporting period. In one embodiment, the screening period is set as 8 frames.

With regard to the screening criteria, in the case of reported backlog, the IGM will periodically analyze the reported backlog of the remote terminals based on a screening period (e.g., average backlog over the screening period or backlog per current report frame). For example, each terminal within the screen group will periodically provide a report of its current backlog at time intervals based on the backlog reporting period. Based on the analysis of the reported backlog, the IGM may select a terminal among the group with a reported backlog that exceeds a predetermined threshold, and dispatched the selected terminal to the Traffic Express Lane for a given period of time or until the reported backlog falls to a zero value or a value set as a threshold for removing the terminal from the express lane. By way of example, a qualifying backlog may be set as a minimum threshold for the averaged backlog of a terminal in order for the terminal to qualify for access to the express lane, e.g., denoted as $A_{QUALIFY}$. As one aspect, the qualifying backlog serves to ration access to the express lane to ensure that is not being used unnecessarily or too frequently, and to prevent inefficient utilization or over stressing of the available bandwidth. The qualifying backlog can be defined in terms of any single type or priority of backlog traffic or the summation of all types/priorities of backlog traffic. Further, the selection among multiple qualifying remote terminals may either be random or follow rules designed to determine a best candidate of the group of qualifying terminals. In accordance with one embodiment, the qualifying backlog is defined in terms of the summation of all backlog traffic types and is set at a value of $A_{QUALIFY}$=20 kbytes, and qualification among a group of qualifying remote terminals is applied randomly.

With regard to the screening criteria of the modulation and coding scheme of a terminal, the IGM may deny a terminal from accessing the express lane based on the operating modulation coding scheme of the terminal, even though the terminal may qualify for the express lane based on a reported backlog. By way of example, if a terminal that otherwise qualifies for the express lane is utilizing a modulation and coding scheme that would prevent it from fully utilizing the express lane (e.g., where the terminal is in a rain fade situation and is thus using a lower rate modulation and coding scheme). By way of further example, the modcod criteria may require a modulation and code rate better than a (QPSK, 4/5). Alternatively, or in addition, for 2 Msps inroutes, there may be two modulation and code rate groups that qualify for the express lane, e.g., (QPSK, 4/5) and (QPSK, 9/10).

In accordance with example embodiments, as a further aspect for rationing access to the express lane, probabilities can be applied to the qualified terminals to further determine which terminals will be granted access to the express lane. By way of example, when a qualifying candidate terminal is selected, the terminal is assigned a probability p (where p≤1), which determines whether the terminal is granted access to the express lane (allocated bandwidth on express lane inroute(s)) or is placed in the backlog based allocation stage (whereby the terminal will be allocated bandwidth based on its backlog along with other terminals being granted backlog-based bandwidth allocations). In other words, the IGM dispatches the terminal either to the express lane bandwidth allocation stage 205 or the backlog based bandwidth allocation stage 213, based on the probabilities p and 1−p, respectively. The probability p is referred to as accessing probability. Where p=1, the IGM grants the selected terminal access to the express lane bandwidth allocation stage, and where p=0, the terminal is placed in the backlog based bandwidth allocation stage. When p=0.50, the terminal has 50% chance of being granted access to the express lane, and a 50% chance of being placed in the backlog based allocation stage.

In accordance with further example embodiments, once the terminal is granted access to the express lane bandwidth allocation stage, the IGM monitors the reported backlog of the terminal during a preconfigured monitoring period, denoted as $T_{MONITOR}$. By way of example, the terminal may remain in the express lane stage until either the reported backlog falls to a level below a threshold, or the expiration of a pre-configured time period. The backlog threshold for staying in is denoted as $A_{STAY}$ and the pre-configured timeout is denoted as $T_{ON}$. According to one embodiment, $A_{STAY}$=2 kbytes. The monitoring period $T_{MONITOR}$ reflects an additional parameter that may be dynamically configured for controlling terminal access to and duration of time within the express lane. By way of example, the monitoring period may be set relative to the backlog reporting period, such as setting the monitoring period to be equal to the reporting period (e.g., 8 frames) so the reported backlog can be directly applied. Further, the monitoring period should be set in a manner whereby a terminal does not remain in the express lane stage for a longer period than it needs to be to alleviate its backlog. According to a further embodiment, after the respective terminal(s) are removed from the express lane allocation stage, the express lane is closed for a pre-configured period, denoted as $T_{OFF}$. According to one embodiment, the values for $T_{ON}$ and $T_{OFF}$ may be set as can be equivalently $T_{ON}$=10 seconds or $T_{ON}$=15 seconds $T_{OFF}$=1 second. After $T_{OFF}$, the IGM resumes screening for dispatching a next terminal or terminals to the express lane allocation stage. With reference again to FIG. 2, the screening may be set to begin $T_{SCREEN}$ frames prior to the expiration of $T_{OFF}$ such that the next choice is made when $T_{OFF}$ expires.

By way of further example, if a qualifying terminal is not dispatched to the express lane stage (e.g., based on the respective probability), the IGM may wait for the duration of the $T_{OFF}$ period before making a new decision regarding the dispatch of other qualifying terminals. As one aspect, the rationale for employing such probabilities is to reduce potential stress on the periodic allocation and the backlog-based allocation stages such that other terminals are not starved of bandwidth. Further, the probability p can be either a configuration parameter or derived at run-time.

Essentially the probability p makes the non-entry time to the express lane longer. The average non-entry time would be $T_{OFF}$/p. Given sufficiently large data files, the ratio of entry and non-entry times would be $T_{ON}$:($T_{OFF}$/p). By way of example, if p=0.01, $T_{ON}$=10 seconds, $T_{OFF}$=1 second, then there would be an average of one entry every 100 seconds for a single inroute, and if there are 10 inroutes in an inroute group, then there would be an average of one entry every 10 seconds for the inroute group.

By way of further example, the IGM may be configured to calculate the overall load level of an inroute or inroute group, and could thereby determine when to enable or disable the Traffic Express Lane, and set the duration of $T_{ON}$, accordingly. The express lane can thereby be dynamically operated based changing system loads. For example, when VOIP calls are present, the available actual throughput rate could be smaller. Table 1, below, presents a numerical analysis based on 0, 10 and 20 VOIP reservations, and illustrates that the speed can still meet the targeted rate (2.0 Mbps) for files with reasonable sizes even given the presence of VOIP calls (constant bit rate allocations of a higher priority than the express lane).

Accordingly, in the context of such example embodiments, a terminal that qualifies for access to the express lane, may be provided a required throughput for a sustained period of time to alleviate its backlog issues, and thereby realize a throughput commensurate with its subscription status. Whereas, by contrast, in the case of a simple priority inversion approach, the terminal would not necessarily receive the required throughput for any sustained period, and thus may fail to realize throughput levels commensurate with its subscription status.

Examples of facilitating speed and transmission of large data files may be as follows: (1) when $T_{ON}$ is appropriately set (e.g., 10 seconds), a user terminal can obtain an average speed result of 2.56 Mbps using a file of 3.0 Mbytes for a terminal with a 2 Mbps rate plan (configured with 2.7 Mbps); and (2) considering a data file size distribution of 1 Mbytes on average, given a 2 Mbps rate plan (configured 2.7 Mbps), the average time of using the Traffic Express Lane is 3.46 seconds, so the large data file is can be transmitted very fast, without hurting system performance—See, e.g., Table 1, below.

In accordance with further embodiments, to avoid excessive use by a terminal, the IGM may allow a terminal only a maximum number of consecutive entries, denoted as $N_{ENTRY}$. The IGM may thereby disqualify a terminal that reaches $N_{ENTRY}$ for a time period, $T_{NON-ENTRY}$, before again permitting express lane access. According to one embodiment, $N_{ENTRY}$=3 consecutive entries and $T_{NON-ENTRY}$=2 seconds. Further, the use of the Traffic Express Lane may also be controlled at different levels depending on system circumstances, such as during peak and non-peak hours. By way of example, two additional configuration parameters may be implemented (e.g., $T_{START}$ and $T_{END}$), whereby $T_{START}$ reflects the start time and $T_{END}$ reflects the end time of the peak hours of a day. For example, $T_{START}$=1:00 am and $T_{END}$=4:00 pm, whereby the dispatching probability p can be configured at different values for peak and non-peak hours, accordingly, denoted respectively as $P_{PEAK}$ and $P_{NON-PEAK}$. By way of example, $P_{PEAK}$=0 and $P_{NON-PEAK}$=1.

The following provides a case study regarding the throughput performance of the express lane staged allocation approach, in accordance with an example embodiment, as follows: Configured Throughput: 2.7/2.45/2.20 Mbps (Assume each CBR consumes 25 kbps—Considering 0, 10 and 20 CBRs for 2.7 Mbps configured rate); Average start time—0.5*(default 0.5×(default $T_{OFF}$)=0.5×1.0=0.5 seconds; Max start time—default $T_{OFF}$=1.0 seconds; Min start time—0.5×$T_{SCREEN}$=0.5×0.045×8=0.18 seconds. The numerical results are shown in Table 1, wherein the column "Avg Perceived Rate (Mbps)" is the average throughput rate when a terminal runs a speed test using the file size listed on the column "File size (M bytes)".

| File size (M bytes) | Total Avg Tx time (sec) | Avg Perceived Rate (Mbps) | Total Max Tx Time (sec) | Min Perceived Rate (Mbps) | Total Min Tx Time (sec) | Max Perceived Rate (Mbps) |
|---|---|---|---|---|---|---|
| Actual Throughput Rate = 2.70 kbps (0 VOIP calls) | | | | | | |
| 1.00 | 3.46 | 2.31 | 3.96 | 2.02 | 3.14 | 2.55 |
| 2.00 | 6.43 | 2.49 | 6.93 | 2.31 | 6.11 | 2.62 |
| 3.00 | 9.39 | 2.56 | 9.89 | 2.43 | 9.07 | 2.65 |
| 4.00 | 12.35 | 2.59 | 12.85 | 2.49 | 12.03 | 2.66 |
| 5.00 | 15.31 | 2.61 | 15.81 | 2.53 | 14.99 | 2.67 |
| 6.00 | 18.28 | 2.63 | 18.78 | 2.56 | 17.96 | 2.67 |
| 7.00 | 21.24 | 2.64 | 21.74 | 2.58 | 20.92 | 2.68 |
| 8.00 | 24.20 | 2.64 | 24.70 | 2.59 | 23.88 | 2.68 |
| 9.00 | 27.17 | 2.65 | 27.67 | 2.60 | 26.85 | 2.68 |
| 10.00 | 30.13 | 2.66 | 30.63 | 2.61 | 29.81 | 2.68 |
| Actual Throughput Rate = 2.45 kbps (10 VOIP calls) | | | | | | |
| 1.00 | 3.77 | 2.12 | 4.27 | 1.88 | 3.45 | 2.32 |
| 2.00 | 7.03 | 2.28 | 7.53 | 2.12 | 6.71 | 2.38 |
| 3.00 | 10.30 | 2.33 | 10.80 | 2.22 | 9.98 | 2.41 |
| 4.00 | 13.56 | 2.36 | 14.06 | 2.28 | 13.24 | 2.42 |
| 5.00 | 16.83 | 2.38 | 17.33 | 2.31 | 16.51 | 2.42 |
| Actual Throughput Rate = 2.20 kbps (20 VOIP calls) | | | | | | |
| 1.00 | 4.14 | 1.93 | 4.64 | 1.73 | 3.82 | 2.10 |
| 2.00 | 7.77 | 2.06 | 8.27 | 1.93 | 7.45 | 2.15 |
| 3.00 | 11.41 | 2.10 | 11.91 | 2.02 | 11.09 | 2.16 |
| 4.00 | 15.05 | 2.13 | 15.55 | 2.06 | 14.73 | 2.17 |
| 5.00 | 18.68 | 2.14 | 19.18 | 2.09 | 18.36 | 2.18 |

Figure 4:
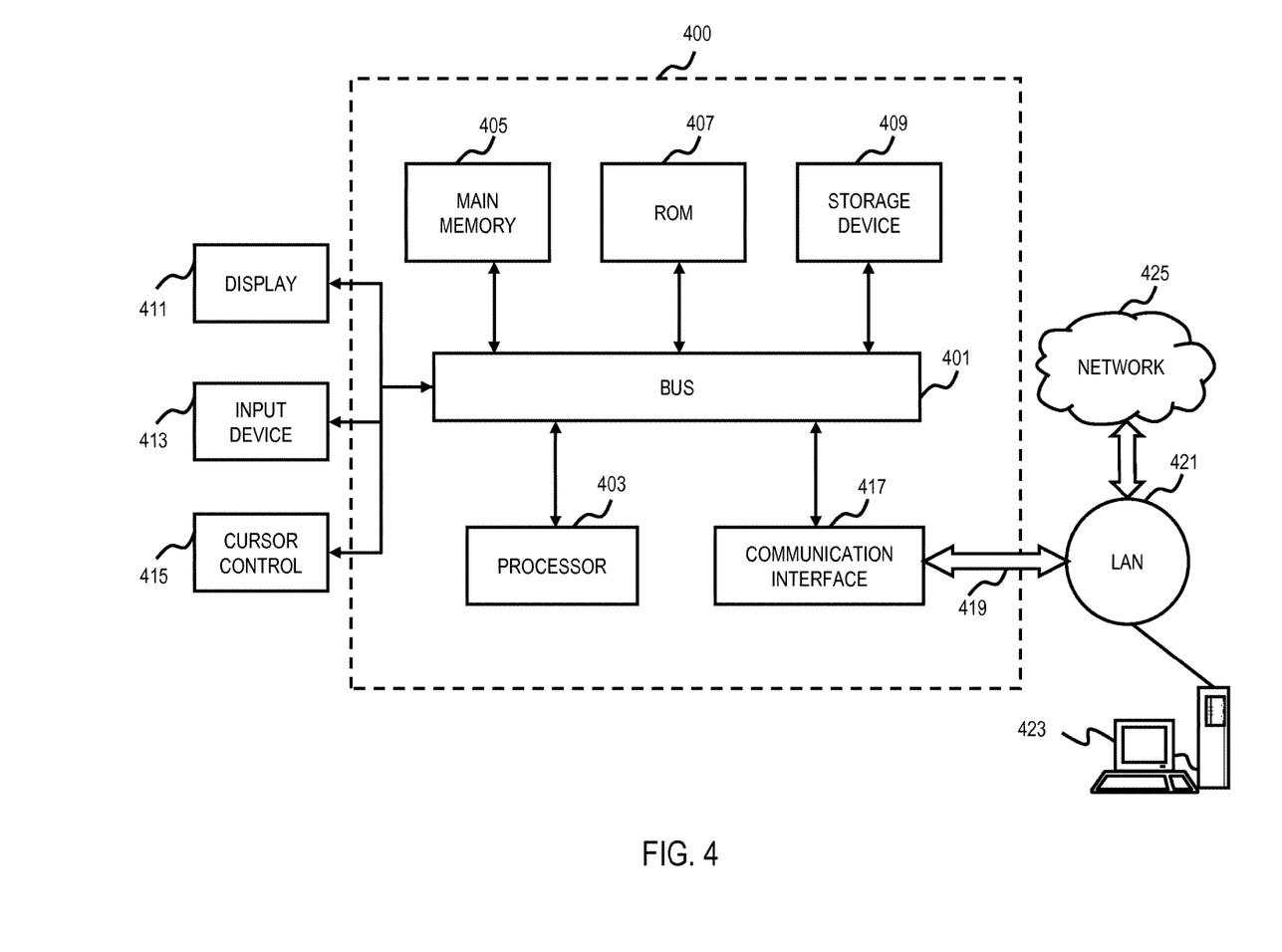
FIG. 4 illustrates a computer system upon which example embodiments according to the present invention can be implemented.

FIG. 4 illustrates a computer system upon which example embodiments according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

The computer system 400 is coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is cursor control 415, such as a mouse, a trackball, or cursor direction keys for communicating direction information and command selections to the processor 403 and for controlling cursor movement on the display 411.

According to one embodiment of the invention, dynamic and flexible architectures and methods for association of remote nodes with respective aggregation nodes, in accordance with example embodiments, are provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry is used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417, for example, includes peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 provides a connection through local network 421 to a host computer 423, which has connectivity to a network 425 (e.g. a wide area network (WAN) or the global packet data communication network now commonly referred to as the "Internet") or to data equipment operated by service provider. The local network 421 and network 425 both use electrical, electromagnetic, or optical signals to convey information and instructions. The signals through the various networks and the signals on network link 419 and through communication interface 417, which communicate digital data with computer system 400, are example forms of carrier waves bearing the information and instructions.

The computer system 400 sends messages and receives data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 executes the transmitted code while being received and/or store the code in storage device 239, or other non-volatile storage for later execution. In this manner, computer system 400 obtains application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as storage device 409. Volatile media may include dynamic memory, such as main memory 405. Transmission media may include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    monitoring a backlog level of each of a plurality of remote terminals that share a plurality of uplink data channels of an inroute channel group of a wireless data communications system, wherein the backlog level of each terminal reflects an amount of data traffic within the terminal awaiting transmission, and wherein available bandwidth of the of the uplink data channels is allocated to the plurality of terminals via a plurality of bandwidth allocation stages in a respective order of priority;
    determining that the backlog level of a one of the remote terminals meets a first threshold level that qualifies the one terminal for an express priority bandwidth allocation stage of the plurality of bandwidth allocation stages, wherein the express priority bandwidth allocation stage is positioned ahead of the other bandwidth allocation stages in the respective order of priority for the allocation of the available bandwidth of the uplink data channels, and wherein the available bandwidth of one or more high throughput channels of the uplink data channels is/are dedicated for the express priority bandwidth allocation stage;
    assigning the one terminal to the express priority bandwidth allocation stage based on the determination that the backlog level of the one terminal meets the first threshold, and allocating at least a portion of the available bandwidth of the dedicated one or more high throughput channels to the one terminal while assigned to the express priority bandwidth allocation stage for transmission by the one terminal of its backlog data traffic;
    monitoring the backlog level of the one terminal while assigned to the express priority bandwidth allocation stage; and
    determining that the backlog level of the one terminal has fallen below a second threshold level that disqualifies the terminal from remaining in the express priority bandwidth allocation stage, and accordingly removing the one terminal from the express priority bandwidth allocation stage.

2. The method according to claim 1, wherein, when it is determined that the backlog level of the one remote terminal meets the first threshold level, the method further comprises:
    applying a probability to the one terminal, wherein the applied probability controls whether the terminal is assigned to the express priority bandwidth allocation stage, or whether the terminal is assigned to a backlog based bandwidth allocation stage of a lower priority level than that of the express priority bandwidth allocation stage.

3. The method according to claim 2, wherein, when the terminal is assigned to the backlog based bandwidth allocation stage of a lower priority level than that of the express priority bandwidth allocation stage, the method further comprises:
    determining to assign the one terminal to the express priority bandwidth allocation stage after waiting for a predetermined period of time.

4. The method according to claim 1, wherein the monitoring of the backlog level of each of the plurality of remote terminals is performed on a periodic basis based on a screening period, and the determination that the backlog level of the one of the remote terminals meets the first threshold is based on an average backlog over the screening period.

5. The method according to claim 1, wherein the monitored backlog level of each of a plurality of remote terminals includes at least a subset of the amount of data traffic within the terminal awaiting transmission that is based on respective priority levels of the backlog data traffic.

6. The method according to claim 1, wherein the monitoring of the backlog level of the one terminal while assigned to the express priority bandwidth allocation stage is performed during a predetermined monitoring period, and the one terminal is removed from the express priority bandwidth allocation stage either when the backlog level of the one terminal has fallen below the second threshold level or upon expiration of the monitoring period.

7. The method according to claim 1, further comprising:
    determining an overall load level of the inroute channel group; and
    dynamically controlling the express priority bandwidth allocation stage by modifying the number of the high throughput channels of the uplink data channels that are dedicated for the express priority bandwidth allocation stage based on the determined overall load level of the inroute channel group.

8. A data communications apparatus comprising:
    a receiver configured to receive data transmissions from a plurality of remote terminals via a plurality of uplink data channels of an inroute channel group of a wireless data communications system; and
    a processor configured to monitor a backlog level of each of the plurality of remote terminals, wherein the backlog level of each terminal reflects an amount of data traffic within the terminal awaiting transmission, and to allocate available bandwidth of the of the uplink data channels to the plurality of terminals via a plurality of bandwidth allocation stages in a respective order of priority; and
    wherein the processor is further configured to determine that the backlog level of a one of the remote terminals meets a first threshold level that qualifies the one terminal for an express priority bandwidth allocation stage of the plurality of bandwidth allocation stages, wherein the express priority bandwidth allocation stage is positioned ahead of the other bandwidth allocation stages in the respective order of priority for the allocation of the available bandwidth of the uplink data channels, and wherein the available bandwidth of one or more high throughput channels of the uplink data channels is/are dedicated for the express priority bandwidth allocation stage, wherein the processor is further configured to assign the one terminal to the express priority bandwidth allocation stage based on the determination that the backlog level of the one terminal meets the first threshold, and to allocate at least a portion of the available bandwidth of the dedicated one or more high throughput channels to the one terminal while assigned to the express priority bandwidth allocation stage for transmission by the one terminal of its backlog data traffic, wherein the processor is further configured to monitor the backlog level of the one terminal while assigned to the express priority bandwidth allocation stage, and wherein the processor is further configured to determine that the backlog level of the one terminal has fallen below a second threshold level that disqualifies the terminal from remaining in the express priority bandwidth allocation stage, and to accordingly remove the one terminal from the express priority bandwidth allocation stage.

9. The data communications apparatus according to claim 8, wherein the processor is further configured to apply a probability to the one terminal, wherein, when it is determined that the backlog level of the one remote terminal meets the first threshold level, the applied probability controls whether the terminal is assigned to the express priority bandwidth allocation stage, or whether the terminal is assigned to a backlog based bandwidth allocation stage of a lower priority level than that of the express priority bandwidth allocation stage.

10. The data communications apparatus according to claim 9, wherein, when the terminal is assigned to the backlog based bandwidth allocation stage of a lower priority level than that of the express priority bandwidth allocation stage, the processor is further configured to determine to assign the one terminal to the express priority bandwidth allocation stage after waiting for a predetermined period of time.

11. The data communications apparatus according to claim 8, wherein the monitoring of the backlog level of each of the plurality of remote terminals is performed on a periodic basis based on a screening period, and the determination that the backlog level of the one of the remote terminals meets the first threshold is based on an average backlog over the screening period.

12. The data communications apparatus according to claim 8, wherein the monitored backlog level of each of a plurality of remote terminals includes at least a subset of the amount of data traffic within the terminal awaiting transmission that is based on respective priority levels of the backlog data traffic.

13. The data communications apparatus according to claim 8, wherein the monitoring of the backlog level of the one terminal while assigned to the express priority bandwidth allocation stage is performed during a predetermined monitoring period, and the one terminal is removed from the express priority bandwidth allocation stage either when the backlog level of the one terminal has fallen below the second threshold level or upon expiration of the monitoring period.

14. The data communications apparatus according to claim 8, wherein the processor is further configured to determine an overall load level of the inroute channel group, and to dynamically control the express priority bandwidth allocation stage by modifying the number of the high throughput channels of the uplink data channels that are dedicated for the express priority bandwidth allocation stage based on the determined overall load level of the inroute channel group.

* * * * *